United States Patent
Nordmeyer

(10) Patent No.: US 7,398,668 B2
(45) Date of Patent: Jul. 15, 2008

(54) WEIGHT SENSING SYSTEM AND METHOD FOR VEHICLES WITH NON-FLUID SPRINGS

(75) Inventor: Daniel L. Nordmeyer, Indianapolis, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 11/475,819

(22) Filed: Jun. 27, 2006

(65) Prior Publication Data

US 2007/0295065 A1 Dec. 27, 2007

(51) Int. Cl.
*G01M 17/00* (2006.01)

(52) U.S. Cl. ........................ 73/1.13; 73/11.04

(58) Field of Classification Search ................ 73/1.13, 73/1.15, 11.04, 760, 781, 862.041
See application file for complete search history.

(56) References Cited

U.S. PATENT DOCUMENTS

| | | | |
|---|---|---|---|
| 4,763,709 A | | 8/1988 | Scholer |
| 5,127,277 A | * | 7/1992 | Forrester et al. ........ 73/862.541 |
| 5,267,466 A | * | 12/1993 | Morris ........................ 73/1.81 |
| 5,313,995 A | | 5/1994 | Schultz |
| 5,430,647 A | * | 7/1995 | Raad et al. ..................... 701/38 |
| 5,461,564 A | * | 10/1995 | Collins et al. ................. 701/37 |
| 5,517,847 A | * | 5/1996 | Campbell et al. .......... 73/11.07 |
| 5,629,874 A | | 5/1997 | Mittal |
| 6,098,682 A | | 8/2000 | Kis |
| 6,666,078 B1 | | 12/2003 | Claussen et al. |
| 6,810,727 B1 | | 11/2004 | Davis et al. |
| 2003/0234066 A1 | | 12/2003 | Grotendorst et al. |
| 2004/0084860 A1 | * | 5/2004 | Svartz et al. ............. 280/6.159 |
| 2004/0176889 A1 | | 9/2004 | Capito |
| 2006/0293815 A1 | * | 12/2006 | McCann ....................... 701/37 |
| 2007/0106442 A1 | * | 5/2007 | Lu ............................... 701/38 |

FOREIGN PATENT DOCUMENTS

| DE | 29 18 481 | 11/1980 |
|---|---|---|
| GB | 1 420 921 | 1/1976 |

OTHER PUBLICATIONS

Load-adaptive ESP from Bosch for light commercial vehicles, Bosch Press Release, Feb. 2006, pp. 1 and 2.

* cited by examiner

*Primary Examiner*—Eric S. McCall
(74) *Attorney, Agent, or Firm*—Fay, Sharpe, Beall, Eagan, Minnich & McKee, LLP; Thomas R. Kingsbury

(57) ABSTRACT

A system and method of sensing a load on a vehicle that includes a plurality of wheel-engaging members is disclosed. The vehicle body is supported on the plurality of wheel-engaging members and receives a cargo having a cargo weight. The method includes providing a non-fluid spring having an unloaded length and a spring rate, the non-fluid springs are supported between the vehicle body and one of the wheel-engaging members and being deflected to a loaded length under the cargo weight of the cargo. The method continues with determining the loaded length of the non-fluid springs. The method also includes determining an approximate value of the cargo weight based at least partially upon the spring rate and the loaded length of the non-fluid spring.

18 Claims, 3 Drawing Sheets

WEIGHT SENSING SYSTEM AND METHOD FOR VEHICLES WITH NON-FLUID SPRINGS

BACKGROUND

This disclosure generally relates to the art of vehicle suspension systems and, more particularly, to a system and method of sensing a load on a vehicle having non-fluid springs.

The present novel concept finds particular application and use in conjunction with suspension systems of wheeled vehicles, and will be described herein with specific reference thereto. However, it is to be appreciated that the present novel concept is also amenable to use in other applications and environments, and that the specific uses shown and described herein are merely exemplary.

As vehicles, such as relatively light-duty wheeled vehicles (e.g., passenger vehicles, pick-up trucks and sport utility vehicles), continue to advance in complexity and sophistication, the systems thereof make greater and greater use of data, signals and/or information relating to performance and other conditions (e.g., speed, acceleration, vehicle height, vehicle orientation) of a vehicle as well as the various inputs (e.g., road impact forces) acting thereon. Such data, signals and/or information may be utilized by systems such as automatic braking systems, traction control systems and stability control systems, tire pressure monitoring systems and/or central tire inflation systems, for example.

One additional input or condition of a vehicle that can be utilized by such systems is the external load acting on the vehicle, such as from passengers and/or cargo. Vehicles having air spring suspension systems are well known, and are generally well suited for determining a load of the sprung mass of the vehicle. Normally, the operational components of such an air spring suspension system will be capable of generating a signal indicative of or otherwise having a relation to the overall weight of the sprung mass at any given time.

Unfortunately, comparatively few vehicles are outfitted with air spring suspension system. Rather, the great majority of light-duty vehicles include suspension systems that utilize non-fluid springs. Such non-fluid springs are typically formed from metal, such as steel, for example. Additionally, such non-fluid springs are normally of a well known type and/or construction, such as coil springs, leaf springs or torsion springs, for example. However, due to the nature and operation of suspension systems with non-fluid springs, such systems typically do not include components suitable for use in load determination. As such, vehicles that include systems that utilize data, signals and/or information having a relation to a load on a vehicle typically include an air spring suspension system. As an alternative, such systems may operate using data, signals and/or information other than that relating to the vehicle load condition.

One example of a use or application in which it may be desirable to determine and utilize the value of an approximate load on a vehicle involves the optimal inflation of the vehicle tires. Light-duty vehicles, such as those discussed above, are commonly outfitted with dual-placard tires, which are designed for operation at two different pressure levels. One pressure level is typically used for normal or relatively light vehicle loads, and the second pressure level is generally intended for use when the vehicle is more heavily loaded.

One difficulty with known light-duty vehicles that utilize such dual-placard tires is that the suspension system of such vehicles commonly include non-fluid springs, as discussed above. Such suspension systems, as installed, are generally incapable of determining a value of the approximate load on the vehicle or communicating such an approximate load to a vehicle system or to the vehicle operator. As such, the vehicle operator is usually without any practical means of determining the approximate value of a load on the vehicle. Therefore, the vehicle operator usually cannot easily determine which of the two pressure ranges of such dual-placard tires should be used. As a result, the vehicle operator may not change the air pressure in the vehicle tires in accordance with the load conditions on the vehicle. This can undesirably lead to sub-optimal performance, handling and/or rider comfort of the vehicle.

Accordingly, it has been considered desirable to develop a system and a method operative to overcome the forgoing and other problems and/or difficulties.

SUMMARY OF THE INVENTION

One exemplary method in accordance with the present novel concept of sensing a weight of a load on a vehicle is provided. The vehicle includes an unsprung mass and a sprung mass supported on the unsprung mass. The method includes providing a non-fluid spring having an unloaded length and a spring rate. The non-fluid spring is supported between the sprung mass and the unsprung mass, and is being deflected to a loaded length under the weight of the load. The method also includes determining the loaded length of the non-fluid spring, and determining an approximate weight value of the load based at least partially on the spring rate and the loaded length of the non-fluid spring.

One exemplary embodiment of a suspension system in accordance with the present novel concept for an associated vehicle that includes an associated sprung mass supported on an associated unsprung mass is provided. The associated sprung mass is adapted to support an associated load having an associated weight. The exemplary suspension system includes a non-fluid spring supported between the associated sprung and unsprung masses. The non-fluid spring has a spring rate and a deflection under the associated weight of the associated load. A distance sensor is operatively disposed between the sprung and unsprung masses and is operative to generate a distance signal having a relation to the deflection of the non-fluid spring. A controller is in communication with the distance sensor and receives the distance signal therefrom. The controller is operative to approximately determine the associated weight of the associated load based at least partially on the spring rate and the distance signal.

Another exemplary embodiment of a suspension system in accordance with the present novel concept for an associated vehicle is provided. The associated vehicle includes an associated vehicle body supported on a plurality of associated wheel-engaging members with the associated body being capable of receiving an associated load. The suspension system includes first and second non-fluid springs. The first non-fluid spring is supported between the associated vehicle body and a first one of the plurality of associated wheel-engaging members. The second non-fluid spring is supported between the associated vehicle body and a second one of the plurality of associated wheel-engaging members. The first non-fluid spring has a first spring rate and a first deflection under the associated load. The second non-fluid spring has a second spring rate and a second deflection under the associated load. A first distance sensor is supported between the associated vehicle body and the first one of the plurality of associated wheel-engaging members. The first distance sensor is operative to generate a first distance signal having a relation to the first deflection of the first non-fluid spring. A second distance sensor is supported between the associated vehicle body and the second one of a plurality of associated wheel-engaging members. The second distance sensor is operative to generate a second distance signal having a relation to the second deflection of the second non-fluid spring. A controller is in communication with the first and second distance sensors and receives the first and second distance signals therefrom. The controller is operative to determine a weight of the associated load based at least partially on the first and second spring rates and the first and second distance signals.

One exemplary embodiment of a weight sensing kit in accordance with the present novel concept for use on an associated vehicle is provided. The associate vehicle includes an associated unsprung mass, and an associated sprung mass that is supported on the associated unsprung mass and is adapted to support an associated load having an associated weight. The associated vehicle also includes an associated suspension system operatively connected between the associated sprung and unsprung masses. The associated suspension system includes an associated non-fluid spring that has an associated spring rate. The weight sensing kit includes a distance sensor capable of being operatively secured between the sprung and unsprung masses, and operative to generate a distance signal having a relation to a displacement of the associated spring. A controller is capable of being supported on the associated vehicle and is operative to receive a distance signal from the distance sensor. The controller is also operative to determine the associated weight of the associated load based at least in part on the distance signal and the associated spring rate of the associated non-fluid spring. The controller is further operative to generate an output signal having a relation to at least the associated weight of the associated load.

DETAILED DESCRIPTION OF THE EXEMPLARY EMBODIMENT

Figure 1:
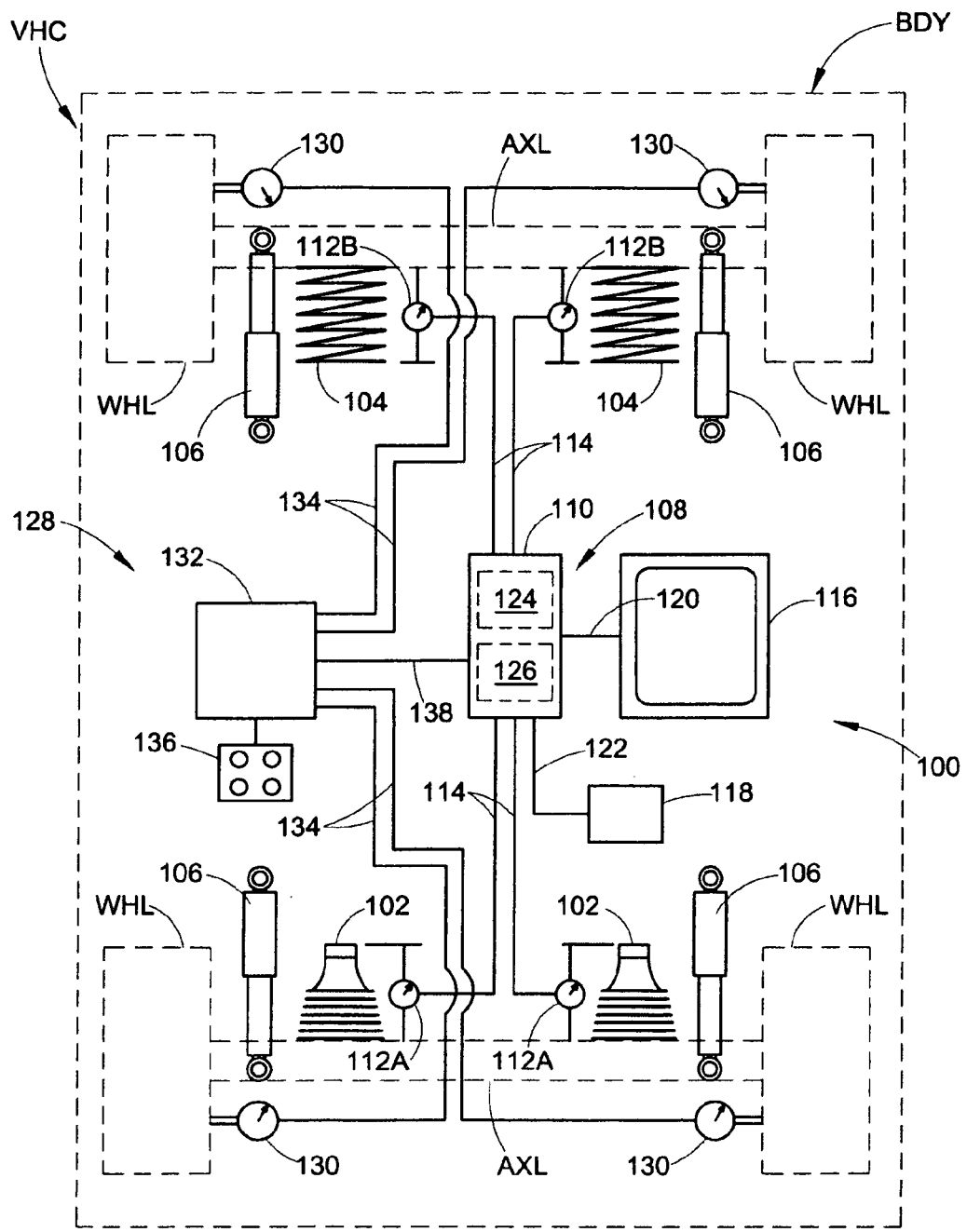
FIG. 1 is a schematic representation of a vehicle suspension system in accordance with the present disclosure.

Referring now to the drawings wherein the showings are for the purpose of illustrating exemplary embodiments of the claimed disclosure only and are not intended to limit the same, FIG. 1 illustrates a vehicle VHC that includes a sprung mass, such as a vehicle body BDY, for example, supported on an unsprung mass, such as axles AXL and/or wheels WHL, for example. The sprung mass of the vehicle can be of any suitable type, kind and/or configuration, such as a body of a passenger vehicle, pick-up truck or sport utility vehicle, for example, and will generally be capable of supporting an operator as well as any optional cargo and/or one or more optional passengers. It will be appreciated that the operator together with any cargo and/or passengers form or otherwise act as a load on the vehicle.

Additionally, vehicle VHC includes a suspension system 100, which can be operatively connected between the sprung and unsprung masses of the vehicle in any suitable manner. The suspension system can include one or more non-fluid springs of any suitable type, kind and/or configuration, such as coil springs, leaf springs, torsion springs and/or any combination thereof. In the exemplary embodiment shown, suspension system 100 includes a plurality of first non-fluid springs 102, such as leaf springs disposed along the rear of a vehicle, for example. The embodiment in FIG. 1 also illustrates an optional plurality of second non-fluid springs 104, such as coil springs disposed along the front of a vehicle, for example. The suspension system can also include one or more dampers of any suitable type, kind and/or configuration, such as shock absorbers or struts, for example. In the embodiment shown, suspension system 100 includes a plurality of dampers 106 disposed along the front and rear of the vehicle in operative association with non-fluid springs 102 and 104.

Suspension system 100 also includes a load determining system 108 that is operatively associated with vehicle VHC. Load determining system 108 includes a controller, such as an electronic control unit (ECU) 110, for example, supported on the vehicle in a suitable manner, such as on or within a cabin or passenger compartment, for example. Load determining system 108 also includes at least one distance indicating device, which can be of any suitable type, kind and/or configuration, that is operatively associated with the vehicle, such as to indicate a height of a vehicle body relative to a road surface or to indicate a distance between a sprung mass and an unsprung mass of a vehicle, for example. For example, the one or more distance indicating devices could take the form of mechanical linkage sensors, linear transducers, ultrasonic wave sensors and/or electromagnetic wave sensors. As shown in FIG. 1, load determining system 108 includes height sensors 112A and 112B supported on the vehicle adjacent each of the non-fluid springs. However, it will be appreciated that other arrangements could alternately be used. For example, the height sensors could be operatively associated with only the rear of the vehicle or a single height sensor could be centered on the vehicle along the rear axle.

The height sensors can be in communication with the ECU or another component in any suitable manner. For example, height sensors 112A and 112B are shown in FIG. 1 as being in communication with ECU 110 through leads or connectors 114, which are suitable for communicating an electrical signal (e.g., a variable voltage or current signal) directly to the ECU. As another example, the vehicle could include a vehicle or system network, and signals (e.g., digital messages) from the height sensors could be communicated to the ECU by way of such a network.

Load determining system 108 is also shown as including a user interface, such as a display screen 116, for example, that is suitable for communicating data, values, signals, instructions and/or any other information or communications to a vehicle operator. Optionally, the user interface can also be adapted for the input of data, values, signals, instructions and/or other information or communications from a vehicle operator, such as by the display screen being adapted for touch screen inputs, for example. Additionally, load determining system 108 can optionally include a temperature sensor 118 or other suitable device for generating a signal (e.g., an electrically variable signal or a digital message) having a relation to an ambient temperature or another temperature associated with the vehicle. The user interface, such as display screen 116, for example, and/or any optional temperature sensor, such as temperature sensor 118, for example, can be in direct communication with the ECU, such as through respective leads or connectors 120 and 122, for example. Alternately, the user interface and/or temperature sensor can optionally be in communication through a vehicle or system network, or in any other suitable manner.

The controller, such as electronic control unit 110, for example, can be of any suitable type, kind, configuration and/or arrangement. Additionally, it will be appreciated that the controller can be a portion or component of another system of the vehicle, such as a global chassis controller or a body control module, for example. Alternately, the controller could be a separate component, such as a separately mounted, standalone electronic control unit (e.g., ECU 110 in FIG. 1), for example. As indicated above, the controller can be of any suitable configuration and/or arrangement. As shown in FIG. 1, ECU 110 includes a processing device 124, such as a microprocessor, microcontroller or microcomputer, for example, and a memory 126, such as a non-volatile memory, for example.

It will be appreciated that wheels WHL of vehicle VHC can be of any suitable type, kind, construction and/or arrangement. For example, the wheels can be of a conventional tubeless construction that includes a hub (not shown) secured to an unsprung mass, such as an axle or other wheel-engaging member, for example, of the vehicle. A tubeless tire (not shown) is received on the hub and is inflated to a suitable tire pressure, as is well known by those of skill in the art. Vehicle VHC can also optionally include a system operatively associated with the tires and/or fluid pressure therein, such as a central tire inflation system (not shown), for example.

As another example, an optional tire pressure monitoring (TPM) system 128 can be included on vehicle VHC and operative to monitor the pressure level of the fluid used to inflate the tires (not shown) of wheels WHL. It will be appreciated that TPM systems are generally well known by those of skill in the art, and generally include at least one pressure sensor operatively associated with the pressurized fluid within the tires of the vehicle. In the exemplary embodiment shown in FIG. 1, TPM system 128 includes a pressure sensor 130 in communication with the pressurized fluid used to inflate the tire of each of wheels WHL. TPM system 128 also includes a controller or other suitable processing device 132, and pressure sensors 130 can be in communication with processing device 132 in any suitable manner. For example, the pressure sensors could generate a signal (e.g., a digital message) having a relation to the tire pressure and communicate that signal to the processing device by way of a suitable vehicle or system network. As another example, pressure sensors 130 can be in direct electrical communication with processing device 132, such as through leads or conductors 134, for example. The TPM system can also optionally include a output device, such as a light panel 136, for example, suitable for communicating a status or condition of one or more of the tires or tire pressures to a vehicle operator. Additionally, the TPM system can also be in communication with other vehicle components and/or system, such as load determining system 108, for example, in any suitable manner, such as by way of a vehicle or system network, for example. Alternately, TPM system 128 could be in direct communication with load determining system 108 through a suitable lead or conductor 138.

It will be appreciated that the non-fluid springs, such as non-fluid springs 102 and 104, for example, will each have a spring rate associated therewith and will deflect under a weight or load in relation to that spring rate. Additionally, it will be appreciated that the spring rate can change or vary as the non-fluid spring deflects depending on the geometry, construction, arrangement and/or characteristics of the non-fluid spring itself. Generally, however, it is well understood that the height or length of a spring will change as the weight or load being carried by the spring changes increases or decreases, and that the height or length will typically decrease as the load increases. Therefore, each spring will have a first height or length under a first load condition and a second, different height or length under a second, different load condition.

In use, as the load (i.e., the operator as well as any passengers and/or cargo) on vehicle VHC increases, such as due to an increase in the number of passengers or the loading of additional cargo, for example, the non-fluid springs, such as non-fluid springs 102 and/or 104, for example, will compress or otherwise deflect toward a lesser height or length. As the load decreases, such as due to a decrease in the number of passengers or an unloading of cargo, for example, the non-fluid springs will extend or otherwise deflect toward a greater height or length. The distance indicating devices, such as height sensors 112A and 112B, for example, of load determining system 108 are operative to generate a signal having a relation to this deflection. Additionally, it will be appreciated that the non-fluid spring length or height, or the deflection or change thereof, can be determined in any suitable manner by the distance indicating devices. For example, height sensors 112A and 112B could generate a signal indicative of a distance between upper and lower portions of the associated non-fluid spring. As another example, the height sensors could generate a signal indicative of the distance between a sprung portion of the vehicle (e.g., a body panel) and an unsprung portion of the vehicle (e.g., an axle or wheel-engaging member). As a further example, the height sensors could generate a signal indicative of the relative distance from a sprung portion of the vehicle to a ground surface. Furthermore, it will be appreciated that the signal generated by the distance indicating device can have any suitable relation to the deflection, height or length of the associated spring. That is, the signal can have a relation to the overall height of length of the associated spring or the signal can have a relation to the deflection or change in the height or length of the associated spring.

In the exemplary embodiment shown, height sensors 112A are operatively associated with non-fluid springs 102 and are adapted to generate a signal having a relation to the height of the non-fluid springs. Thus, as the load on the vehicle (or at least the rear portion thereof changes, the height of non-fluid springs 102 changes in accordance with the spring rate of the springs and height sensors 112A generate signals having a relation to the changed height. Similarly, as the load on the vehicle (or at least the front portion thereof) changes, the height of non-fluid springs 104 changes in accordance with the spring rate of the springs and height sensors 112B generate signals having a relation to the changed height. These height signals can then communicated to ECU 110 in any suitable manner, such as on an approximately continuous basis or intermittently, for example.

Turning now to the operation of the controller of the load determining system, the controller is adapted to receive the one or more height signals from the one or more distance indicating devices and to determine a load on the vehicle based at in part on such one or more height signals as well as on the corresponding spring rates of the non-fluid springs. In one exemplary embodiment, memory 126 includes data, values, algorithms, routines and/or programs having a relation to the spring rate of at least one of the non-fluid springs on the vehicle, and preferably to the spring rate of at least each type or kind of non-fluid spring on the vehicle. In one exemplary embodiment, memory 126 includes data, values, algorithms, routines and/or programs having a relation to the spring rate of each individual spring on vehicle VHC. Thus, variations in the individual springs, such as may be due to manufacturing variations or installed height differences, for example, can be accommodated.

In operation, ECU 110 will receive height signals from at least one of height sensors 112A and 112B. The ECU will then retrieve a spring rate for each spring directly from memory 126 or retrieve data, values, algorithms, routines and/or programs for determining the appropriate spring rate for each spring based one or more factors, such as height/length of the spring for variable-rate springs, for example. Additionally, ECU 110 can also utilize other data, values, signals and/or information, such as a temperature signal from temperature sensor 118, for example, to determine the spring rate of one or more of the non-fluid springs. Based at least in part on the height signal or signals as well as the retrieved or otherwise determined spring rate or rates, the approximate load on each spring can be determined, such as by using processing device 124, for example. These approximate loads can then be stored in the memory, communicated to other systems and/or components, or can be summed in an appropriate manner, such as by using processing device 124, for example, to determine the overall load on the vehicle. This value could then be stored in the memory or communicated to other systems and/or components in any suitable manner.

Figure 2:
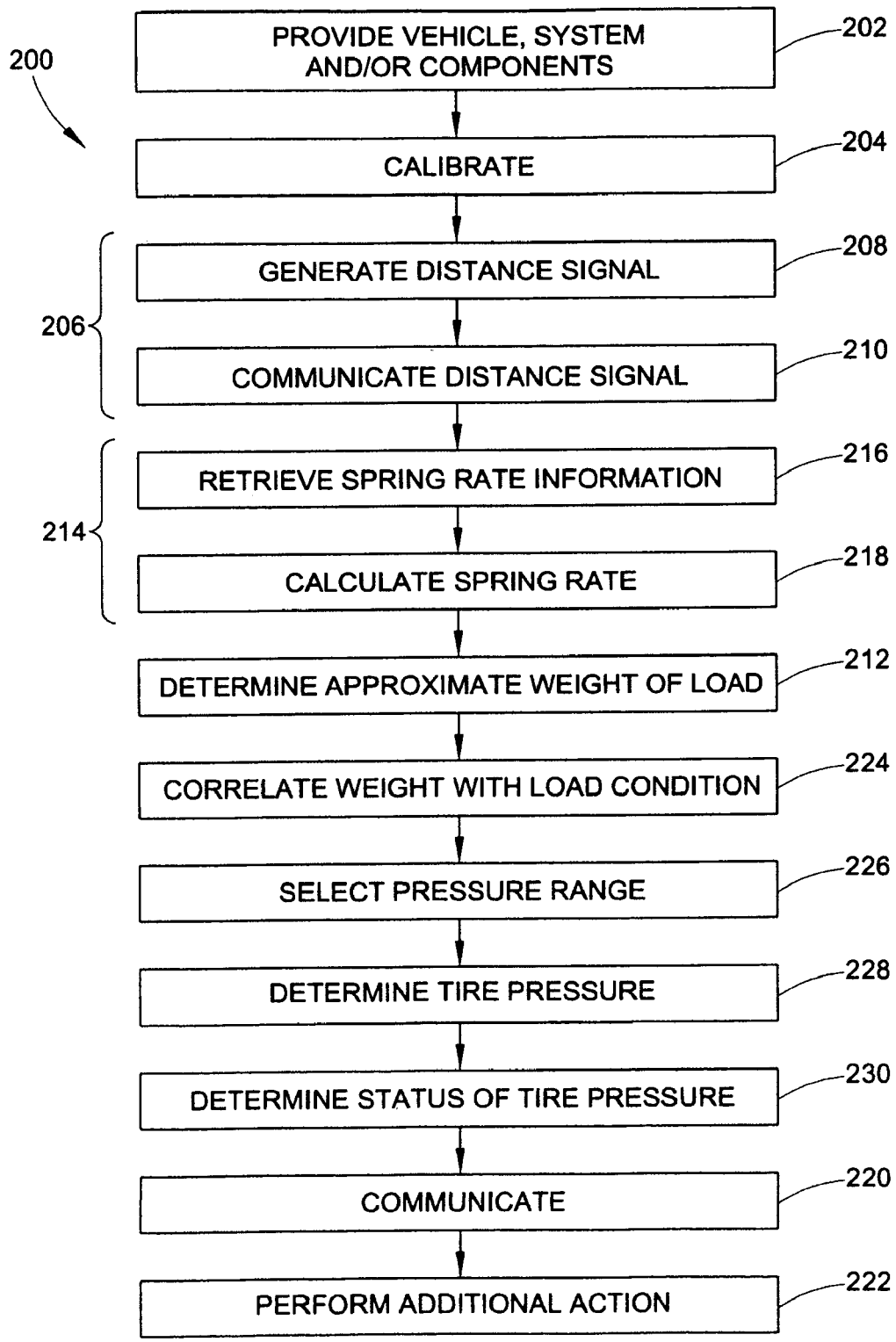
FIG. 2 is a flowchart illustrating one exemplary method according to the present disclosure.

One exemplary method 200 of sensing the approximate weight of a load on a vehicle is shown in FIG. 2. Method 200 includes providing a vehicle and any systems and/or components therefore, as indicated in box 202. For example, a vehicle can be provided that includes an unsprung mass, a sprung mass, and a non-fluid spring, such as one or more of non-fluid springs 102 and/or 104, for example, that is operatively connected therebetween and has an unloaded length and a spring rate. The non-fluid spring is supported between the sprung mass and the unsprung mass, and is being deflected to a loaded length under the weight of the load on the vehicle. As additional examples and without acting as a limitation, such an action can also include providing a load determining system, a controller, a processing device, a memory, an output device and/or a sensor.

Method 200 can optionally include calibrating one or more systems and/or components of the vehicle, as indicated in box 204. For example, such a calibrating action, if performed, can include determining an unloaded length of a non-fluid spring, such as during an initial installation, for example, such as to offset or otherwise adjust for any manufacturing variations in the non-fluid spring, for example. As another example, such a calibrating operation could also, or alternately, include compensating for environmental variables, such as dimensional changes in components and/or material due to temperature variations, for example. It will be appreciated that any data, values and/or information could be stored or otherwise retained by a system, such as system 108, for example, in any suitable manner, such as by storing the data, values and/or information in memory 126, for example.

Once a load, such as an operator as well as any passengers and/or cargo, for example, has been received on the vehicle, method 200 includes determining a loaded length of the non-fluid spring, as indicated by item number 206. Such an action can be performed in any suitable manner. One example can include generating a distance signal using a suitable distance indicating device, such as one of height sensors 112A and 112B, for example, as indicated in box 208, and communicating the distance signal to a suitable system and/or component, such as controller 110, for example, as indicated in box 210.

Method 200 also includes determining an approximate weight of the load in the vehicle, as indicated by box 212, based at least in part on the loaded length determined at item number 206 and the spring rate of the corresponding non-fluid spring. Such an action can be performed in any suitable manner. For example, a controller, such as controller 110, for example, could optionally include a look-up table stored therein that contains approximate weight values for given deflections of the specific non-fluid spring in use on a vehicle. The controller could then correlate the deflection of the non-fluid spring with an approximate weight value. It will be appreciated that because the weight values within such a table will vary from one type, model and/or configuration of non-fluid spring to another, such as due to variations in spring rate, for example, the values within such a look-up table would be expected to change from one non-fluid spring to another. As another example, a controller, such as controller 110, for example, could optionally include an algorithm, routine and/or program that is suitable for determining the approximate weight value of the load on the vehicle. Such an algorithm, routine and/or program could be specific to the type, model and/or configuration of non-fluid spring that is in use on the vehicle. As such, an at least slightly different algorithm, routine and/or program may be used for other, different non-fluid springs.

Rather than utilizing a look-up table and/or algorithm that is specific to a certain type, model and/or configuration of non-fluid spring, method 200 can optionally include determining a spring rate for the corresponding non-fluid spring, as indicated by item number 214. Such a determination can be performed in any suitable manner, such as by retrieving spring rate data, values and/or information from a memory, such as memory 126, for example, as indicated in box 216. For example, an appropriate spring rate for the non-fluid springs installed on the vehicle could be selected or otherwise retrieved from a look-up table or other suitable data storage arrangement, such as during installation of a system, such as system 108, for example, on the vehicle. Additionally, or in the alternative, the spring rate could be calculated using data, values and/or information from box 216 as well as any suitable algorithm, routine and/or program, as indicated in box 218. As one example, the non-fluid spring or springs could have a spring rate that varies with deflection. As such, the spring rate could be calculated or otherwise determined based at least in part on the deflection of the non-fluid spring.

Regardless of the manner in which the approximate weight value of the load on the vehicle is determined in box 212, method 200 also includes communicating the approximate weight value and/or other data, values, signals, instructions and/or information to an operator and/or vehicle system or component, as indicated in box 220. For example, the approximate weight value could be audibly and/or visually communicated to a person, such as the vehicle operator, for example. As another example, a signal indicating that the approximate weight value exceeds a predetermined vehicle weight threshold value could be communicated to a vehicle ignition system, such as to prevent the vehicle from operating in such a laden condition. As a further example, a signal having a relation to the weight of the load on the vehicle could be output to a central tire inflation system that is capable of modifying the fluid pressure level in the inflatable tires on the vehicle. As suggested by the latter two examples, method 200 can optionally include performing an additional action using one or more of the vehicle systems and/or components, as indicated in box 222, such as disengaging a starting system and/or altering a pressure level within one or more tires of the vehicle, for example.

Figure 3:
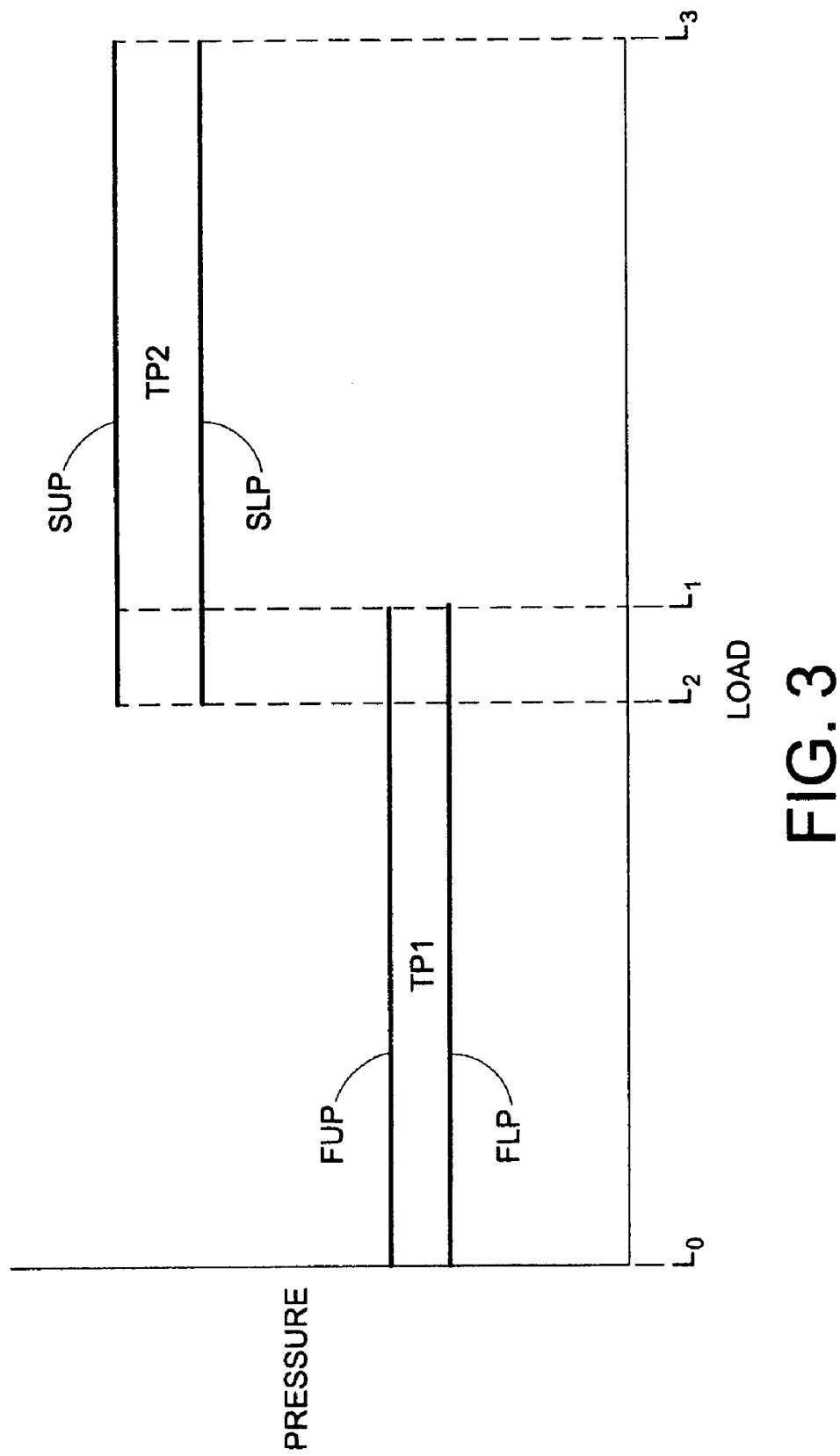
FIG. 3 is a diagrammatic representation of tire pressure versus vehicle load for a known dual-placard tire.

Turning briefly to FIG. 3, a diagrammatic representation is shown that illustrates a relationship of tire pressure versus vehicle load for an inflatable tire that is operable at two different tire pressures depending on the weight of the load on the tire. Such so called "dual-placard" tires have been discussed above and are generally well known by those of skill in the art. As shown in FIG. 3, from an unloaded vehicle condition represented by line $L_0$ to a moderate vehicle load condition represented by line $L_1$, a conventional dual-placard tire will be designed for inflation and use within a first tire pressure range TP1, such as from about a first lower pressure level FLP to about a first upper pressure level FUP. From a moderate vehicle load condition represented by line $L_2$ to a maximum load condition represented by line $L_3$, a conventional dual-placard tire will be designed for inflation and use within a second tire pressure range TP2, such as from about a second lower pressure level SLP to about a second upper pressure level SUP. It will be recognized that an overlap exists between line $L_2$ and line $L_1$. For loads within this overlap area, it may be possible to use either tire pressure range. It will be appreciated that the load values associated with lines $L_1$, $L_2$ and $L_3$ as well as the inflation pressures associated with ranges TP1 and TP2 will vary from tire to tire. One example of suitable values for the tire pressure ranges TP1 and TP2 are from about 25 psi to about 40 psi and from about 45 psi to about 65 psi, respectively.

Returning again to FIG. 1, though it will be appreciated that any other suitable system and/or arrangement can alternately, or additionally, be used in operative association with the inflatable tires of wheels WHL, TPM system 128 is shown in use on vehicle VHC. In operation, the tire pressure monitoring system monitors the fluid pressure within the inflatable tires and outputs a visual and/or audible signal or other indication to the vehicle operator if the tire pressure within one or more of the tires deviates from a designated pressure level. Alternately, a central tire inflation system could be used to monitor as well as vary the fluid pressure level within the vehicle tires.

In the exemplary embodiment shown in FIG. 1, processing device 132 of TPM system 128 receives pressure signals from each of pressure sensors 130 in a suitable manner, such as on an approximately continuous basis or intermittently, for example. The processing device can determine whether the pressure signals correspond to the desired fluid pressure level within the inflatable tire. If it is determined by processing device 132 that one or more of the tire pressure levels have deviated from the desired fluid pressure level, an output signal can be generated by processing device 132 and communicated to an output device, such as light panel 136, for example, to communicate to the vehicle operator that a deviation has occurred.

Additionally, processing device 132 can generate a pressure communication signal having a relation to the fluid pressure level within one or more of the inflatable tires of the vehicle. As one example, the processing device could determine an average fluid pressure value based upon the pressure signals and generate the pressure communication signal in relation to the an average fluid pressure value. Alternately, the processing device could generate an average fluid pressure value for the front axle of a vehicle and a separate average fluid pressure value for the rear axle of the vehicle. Two pressure communication signals could then be generated by the processing device. As still another example, the processing device could generate a pressure communication signal in relation to the fluid pressure level in each of the inflatable tires. As such, it will be appreciated that any suitable arrangement can be used.

A pressure communication signal can then be communicated from processing device 132 to ECU 110 in a suitable manner, such as by way of conductive lead 138, for example. Memory 126 can include data, values, information, algorithms, routines and/or programs having a relation to one or more tire pressure ranges, such as tire pressure ranges TP1 and TP2 in FIG. 3, for example, for the inflatable tires on the vehicle. Processing device 124 of ECU 110 can determine an appropriate tire pressure range for the tires based on the load on the vehicle, which could be determined in a manner such as has been discussed above, for example, and the information in memory 126 relating to the tire pressure ranges for the inflatable tires of the vehicle. Processing device 124 is adapted to then compare the pressure communication signal or signals with the determined appropriate tire pressure range. If the current tire pressure level is determined to be outside the appropriate tire pressure range, then processing device 124 of ECU 110 can generate an output signal and communicate the output signal to the user interface, such as display screen 116, for example, to indicate to the vehicle operator that a modification of a tire pressure level is recommended. Optionally, ECU 110 could communicate a signal having a relation to the vehicle load/tire pressure condition to other components and/or systems. For example, a signal could be communicated from the ECU to an engine controller (not shown) which could in turn disallow the vehicle from starting.

Returning again to FIG. 2, method 200 can optionally include correlating an approximate weight value of the load on the vehicle with a load condition, such as from an unloaded condition to a moderate vehicle load ($L_0$ to $L_1$) or from a moderate load condition to a maximum load condition ($L_2$ to $L_3$), for example, as indicated in box 224. Method 200 can also optionally include selecting or otherwise determining a tire pressure range, such as tire pressure range TP1 or TP2, for example, as indicated in box 226. Such an action can be performed in any suitable manner, and can optionally be based at least in part on the load condition determined in box 224. In one embodiment, method 200 can then proceed as indicated in box 220 to communicate the determined tire pressure range to a person, such as the vehicle operator, for example, and/or a vehicle system or component.

Method 200 can also optionally include determining the fluid pressure value of the fluid within one or more of the inflatable tires on the vehicle, as indicated in box 228. Such an action can be performed in any suitable manner, such as by utilizing TPM system 128, for example. Method 200 can further optionally include determining a status of the fluid pressure within the tires, as indicated by box 230. For example, such an action could include comparing a signal having a relation to a fluid pressure within an inflatable tire to data corresponding to the tire pressure range within which the fluid pressure should be. Such an action could result in a determination as to whether or not the fluid pressure within the inflatable tire is inside the determined tire pressure range. An appropriate signal, data and/or instruction could then be communicated to another system and/or to a person, such as the vehicle operator.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A method of sensing a weight of a load on a vehicle that includes an unsprung mass and a sprung mass supported on the unsprung mass, said method comprising:
   a) providing a non-fluid spring, a controller, and a distance sensor in communication with said controller and operatively associated with said non-fluid spring, said non-fluid spring having an unloaded spring dimension and a spring rate, said non-fluid spring supported between the sprung mass and the unsprung mass and being deflected to a loaded spring dimension under the weight of the load, said controller including a memory storing a plurality of loaded spring dimension ranges for said non-fluid spring and a plurality of approximate weight values corresponding to said plurality of loaded spring dimension ranges;
   b) determining said loaded spring dimension of said non-fluid spring by generating a distance signal having a relation to said loaded spring dimension of said non-fluid spring using said distance sensor and communicating said distance signal to said controller; and
   c) determining an approximate weight value of the load based at least partially on said spring rate and said loaded spring dimension of said non-fluid spring by correlating said distance signal with a loaded spring dimension range of said plurality of loaded spring dimension ranges and retrieving an approximate weight value from said memory based at least in part on said loaded spring dimension range.

2. A method of sensing a weight of a load on a vehicle that includes an unsprung mass and a sprung mass supported on the unsprung mass, said method comprising:
   a) providing a non-fluid spring, a controller, and a distance sensor in communication with said controller and operatively associated with said non-fluid spring, said non-fluid spring having an unloaded spring dimension and a spring rate, said non-fluid spring supported between the sprung mass and the unsprung mass and being deflected to a loaded spring dimension under the weight of the load, said controller including a processing device and a memory storing a spring rate value having a relation to said spring rate of said non-fluid spring;
   b) determining said loaded spring dimension of said non-fluid spring by generating a distance signal having a relation to said loaded spring dimension of said non-fluid spring using said distance sensor and communicating said distance signal to said controller; and,
   c) determining an approximate weight value of the load based at least partially on said spring rate and said loaded spring dimension of said non-fluid spring by retrieving said spring rate value from said memory and calculating said approximate weight value based at least in part on said spring rate value.

3. A method of sensing a weight of a load on a vehicle that includes an unsprung mass and a sprung mass supported on the unsprung mass, the unsprung mass of the vehicle including a wheel operatively associated therewith, the wheel including an inflatable tire having a tire pressure and being operable within a first tire pressure range under a first load condition and within a second tire pressure range under a second load condition, said method comprising:
   a) providing a non-fluid spring and an output device, said non-fluid spring having an unloaded spring dimension and a spring rate, and said non-fluid spring being supported between the sprung mass and the unsprung mass, and being deflected to a loaded spring dimension under the weight of the load;
   b) determining said loaded spring dimension of said non-fluid spring;
   c) determining an approximate weight value of the load based at least partially on said spring rate and said loaded spring dimension of said non-fluid spring;
   d) correlating said approximate weight value with one of said first and second load conditions;
   e) selecting one of the first tire pressure range and the second tire pressure range based at least in part on said correlated load condition in d); and,
   f) communicating said selected one of the first and second tire pressure ranges using said output device.

4. A method of sensing a weight of a load on a vehicle that includes an unsprung mass and a sprung mass supported on the unsprung mass, said method comprising:
   a) providing a non-fluid soring and a temperature sensor operative to generate a temperature signal having a relation to an environmental temperature, said non-fluid spring having an unloaded spring dimension and a spring rate, said non-fluid spring supported between the sprung mass and the unsprung mass, and being deflected to a loaded spring dimension under the weight of the load;
   b) determining said loaded spring dimension of said non-fluid spring;
   c) determining an approximate weight value of the load based at least partially on said spring rate and said loaded spring dimension of said non-fluid spring; and
   d) compensating for a variation in the environmental temperature in at least one of b)or c).

5. A method of sensing a weight of a load on a vehicle that includes an unsprung mass and a sprung mass supported on the unsprung mass, a starting system and a load weight threshold, said method comprising:
   a) providing a non-fluid spring having an unloaded spring dimension and a spring rate, and said non-fluid spring being supported between the sprung mass and the unsprung mass, and being deflected to a loaded spring dimension under the weight of the load;
   b) determining said loaded spring dimension of said non-fluid spring;
   c) determining an approximate weight value of the load based at least partially on said spring rate and said loaded spring dimension of said non-fluid spring; and,
   d) disengaging the starting system if said approximate weight value exceeds the load weight threshold.

6. A suspension system for an associated vehicle that includes an associated sprung mass supported on an associated unsprung mass, the associated sprung mass adapted to support an associated load having an associated weight, said suspension system comprising:
   a non-fluid spring supported between the associated sprung and unsprung masses, said non-fluid spring having a spring rate and a deflection under the associated weight of the associated load;
   a distance sensor operatively disposed between the sprung and unsprung masses and operative to generate a distance signal having a relation to said deflection of said non-fluid spring; and.
   a controller in communication with said distance sensor and receiving said distance signal therefrom, said controller including a memory storing a plurality of approximate load weight values corresponding to a plurality of deflections of said non-fluid spring, and said controller operative to approximately determine the associated weight of the associated load based at least partially on said spring rate and said distance signal.

7. A suspension system for an associated vehicle that includes an associated vehicle body supported on a plurality of associated wheel-engaging members with the associated body capable of supporting an associated load, said suspension system comprising:
- first and second non-fluid springs, said first non-fluid spring supported between the associated vehicle body and a first one of the plurality of associated wheel-engaging members, said second non-fluid spring supported between the associated vehicle body and a second one of the plurality of associated wheel-engaging members, said first non-fluid spring having a first spring rate and a first deflection under the associated load, said second non-fluid spring having a second spring rate and a second deflection under the associated load;
- a first distance sensor supported between the associated vehicle body and the first one of the plurality of associated wheel-engaging members, said first distance sensor operative to generate a first distance signal having a relation to said first deflection of said first non-fluid spring;
- a second distance sensor supported between the associated vehicle body and the second one of the plurality of associated wheel-engaging members, said second distance sensor operative to generate a second distance signal having a relation to said second deflection of said second non-fluid spring; and,
- a controller in communication with said first and second distance sensors and receiving said first and second distance signals therefrom, said controller operative to determine a weight of the associated load based at least partially on said first and second spring rates and said first and second distance signals.

8. A suspension system for an associated vehicle that includes an associated sprung mass supported on an associated unsprung mass, the associated sprung mass adapted to support an associated load having an associated weight, said suspension system comprising:
- a non-fluid spring supported between the associated sprung and unsprung masses, said non-fluid spring having a spring rate and a deflection under the associated weight of the associated load;
- a distance sensor operatively disposed between the sprung and unsprung masses and operative to generate a distance signal having a relation to said deflection of said non-fluid spring; and,
- a controller in communication with said distance sensor and receiving said distance signal therefrom, said controller including a memory and a processing device, said memory storing said spring rate and an algorithm for approximately determining the associated weight of the associated load based at least partially on said spring rate and said distance signal, and said controller operative to approximately determine the associated weight of the associated load based at least partially on said spring rate and said distance signal.

9. A suspension system according to claim 8, wherein said controller is operative to generate an output signal indicative of the associated weight of the associated load, and said suspension system further comprises an output device in communication with said controller, said output device adapted to receive said output signal and communicate the associated weight of the associated load.

10. A weight sensing kit for use on an associated vehicle having an associated unsprung mass, an associated spruna mass supported on the associated unsprung mass and adapted to support an associated load having an associated weight, and an associated suspension system operatively connected between the associated sprung and unsprung masses, the associated suspension system including an associated non-fluid spring having an associated spring rate, the associated unsprung mass including an associated wheel that includes an associated inflated tire having an associated tire pressure, and the associated vehicle including an associated pressure sensor in communication with the associated inflated tire and operative to generate an associated pressure signal having a relation to the associated tire pressure, said weight sensing kit comprising:
- a distance sensor capable of being operatively secured between the sprung and unsprung masses, and operative to generate a distance signal having a relation to a displacement of the associated non-fluid spring;
- a controller capable of being supported on the associated vehicle and operative to receive said distance signal from said distance sensor and receive the associated pressure signal from the associated pressure sensor, said controller also being operative to determine the associated weight of the associated load based at least in part on said distance signal and the associate spring rate of the associated non-fluid spring, and said controller being further operative to generate an output signal in relation to at least the associated weight and the associated pressure signal.

11. A weight sensing kit according to claim 10 further comprising an output device capable of being supported on the associated vehicle and connected to said controller, said output device adapted to receive the output signal and communicating the associated weight of the associated load.

12. A suspension system for an associated vehicle that includes an associated sprung mass supported on an associated unsprung mass, the associated unsprung mass including an associated wheel that includes an associated inflatable tire having an associated tire pressure, and the associated sprung mass adapted to support an associated load having an associated weight, said suspension system comprising:
- a non-fluid spring supported between the associated sprung and unsprung masses, said non-fluid spring having a spring rate and a deflection under the associated weight of the associated load;
- a distance sensor operatively disposed between the sprung and unsprung masses and operative to generate a distance signal having a relation to said deflection of said non-fluid spring;
- a controller in communication with said distance sensor and receiving said distance signal therefrom, said controller operative to approximately determine the associated weight of the associated load based at least partially on said spring rate and said distance signal; and,
- a pressure sensor in operative association with the associated inflatable tire and in communication with said controller, said pressure sensor adapted to generate a pressure signal having a relation to the associated tire pressure and communicate said pressure signal to the controller.

13. A suspension system according to claim 12, wherein the associated inflatable tire is operable within a first pressure range under a first load condition and within a second pressure range under a second load condition, and said controller is operative to determine whether the associated tire pressure of the associated tire is within an appropriate one of said first and second tire pressure ranges based at least partially on said approximate determination of the associated weight of the associated load.

14. A suspension system according to claim 13, wherein said controller is operative to generate an output signal corresponding to said determination of the associated tire pressure being within an appropriate one of said first and second tire pressure ranges, and said suspension system further comprising an output display in communication with said controller and receiving said output signal therefrom.

15. A method of sensing a weight of a load on a vehicle that includes an unsprung mass and a sprung mass supported on the unsprung mass, the unsprung mass of the vehicle including a wheel operatively associated therewith, the wheel including an inflatable tire having a tire pressure and being operable within a first tire pressure range under a first load condition and within a second tire pressure range under a second load condition, said method comprising:
- a) providing a non-fluid spring having an unloaded spring dimension and a spring rate, and said non-fluid spring being supported between the sprung mass and the unsprung mass, and being deflected to a loaded spring dimension under the weight of the load;
- b) determining said loaded spring dimension of said non-fluid spring;
- c) determining an approximate weight value of the load based at least partially on said spring rate and said loaded spring dimension of said non-fluid spring;
- d) correlating said approximate weight value with one of said first and second load conditions;
- e) selecting one of the first tire pressure range and the second tire pressure range based at least in part on said correlated load condition in d);
- f) determining an approximate pressure value of the tire pressure of the inflatable tire;
- g) determining if said approximate pressure value is within said selected one of said first and second tire pressure ranges; and,
- h) generating a signal indicative of said determination in g).

16. A method according to claim 15, wherein a) includes providing a controller and a pressure sensor in communication with said controller and in operative association with the inflatable tire, and f) includes determining said approximate tire pressure using said pressure sensor.

17. A method according to claim 16, wherein f) includes generating a pressure signal having a relation to said approximate tire pressure using said pressure sensor and communicating said pressure signal to said controller.

18. A method according to claim 16, wherein a) includes providing an output device in communication with said controller, and h) includes communicating at least one of said approximate tire pressure, said selected one of said first and second tire pressure ranges, or an indicia of said determination in g) on said output display.

* * * * *